Patented Nov. 24, 1925.

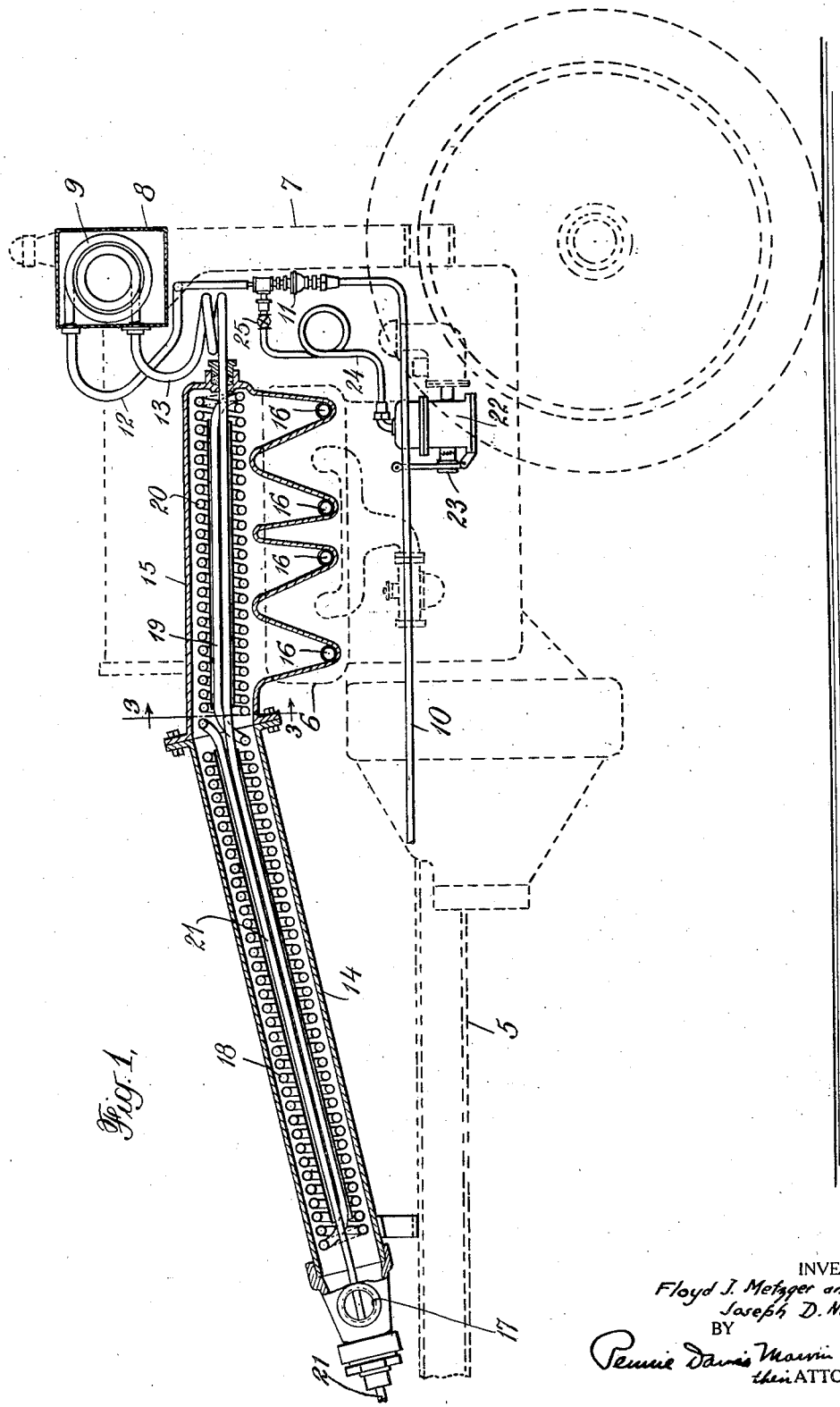

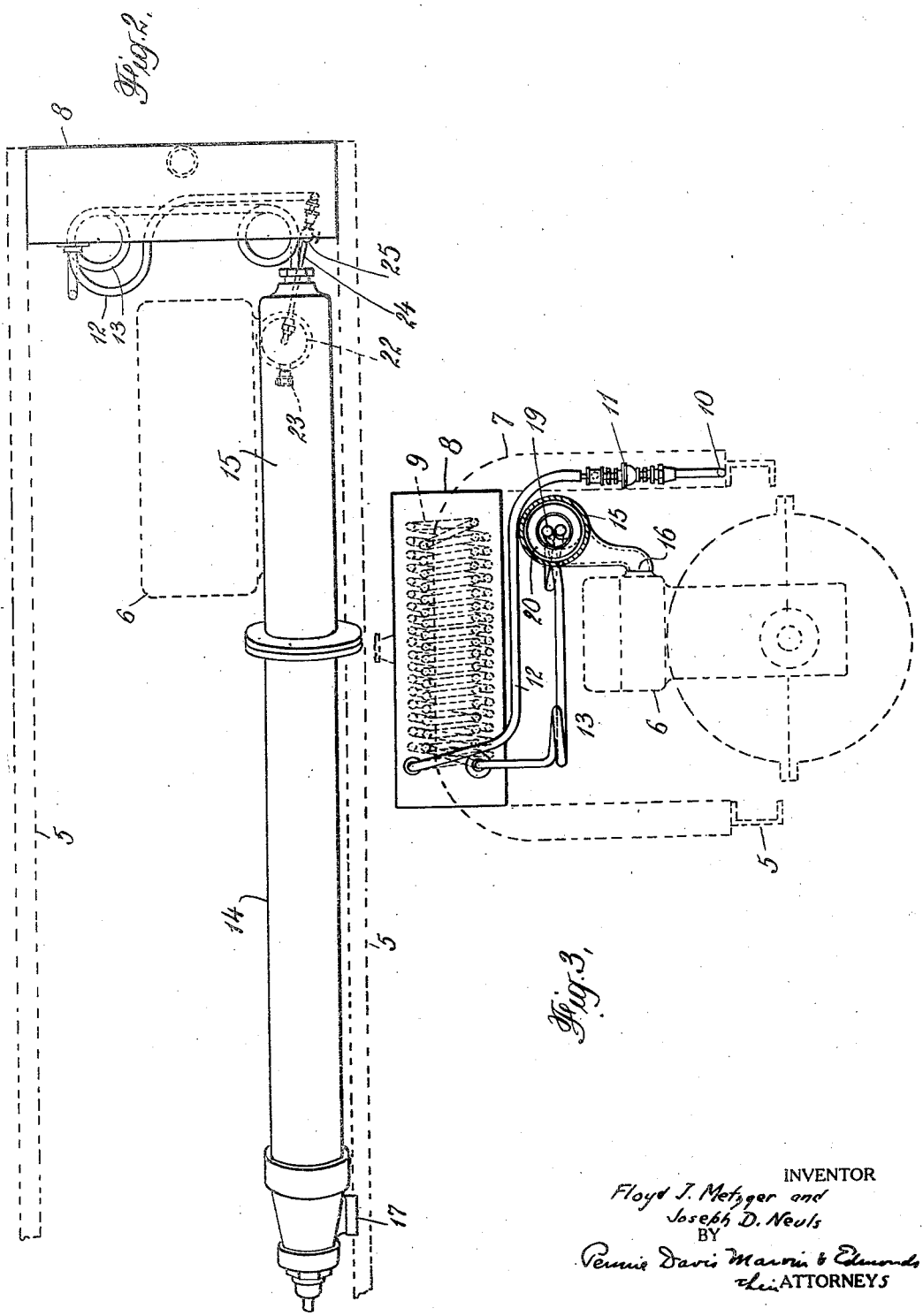

1,562,902

UNITED STATES PATENT OFFICE.

FLOYD J. METZGER, OF NEW YORK, N. Y., AND JOSEPH D. NEULS, OF LOS ANGELES, CALIFORNIA, ASSIGNORS TO CALIFORNIA CYANIDE COMPANY, INC., OF NEW YORK, N. Y., A CORPORATION OF DELAWARE.

FUMIGATING APPARATUS.

Application filed February 15, 1924. Serial No. 693,001.

*To all whom it may concern:*

Be it known that we, FLOYD J. METZGER, a citizen of the United States, residing at New York city, in the county of New York, State of New York, and JOSEPH D. NEULS, a citizen of the United States, residing at Los Angeles, in the county of Los Angeles, State of California, have invented certain new and useful Improvements in Fumigating Apparatus; and we do hereby declare the following to be a full, clear, and exact description of the invention, such as will enable others skilled in the art to which it appertains to make and use the same.

This invention relates to the fumigation of orchards and similar vegetation, and particularly to an apparatus whereby the fumigating agent may be effectively and economically transported and applied. The invention is useful in connection with the application of various fumigating agents, especially hydrocyanic acid and mixtures thereof with water.

Hydrocyanic acid has long been utilized as a fumigating agent in orchards. Because of its toxic properties it is very effective in destroying the insects which infest trees, but it is likewise dangerous to human life and must be handled with extreme care to avoid accidents. The most primitive method of applying hydrocyanic acid involves the generation thereof from cyanides by the application of an acid such as sulfuric. This method is both dangerous and wasteful, and to avoid its difficulties attempts have been made heretofore to utilize liquid hydrocyanic acid in fumigation. To be effective hydrocyanic acid must be applied in the form of vapor, and the attempts mentioned have been directed toward the vaporization of hydrocyanic acid by spraying or by heating. Attempts have been made to vaporize hydrocyanic acid by the application of heat through water baths heated by oil and similar burners. The necessity of employing a source of heat such as that described introduces additional difficulty and expense, but the principal disadvantage of this method of vaporizing the hydrocyanic acid is the difficulty of applying any material amount of superheat to the vapor. This, as will be readily understood, would require the use of a boiler operated under pressure with the attendant danger and the difficulty of controlling the amount of heat applied.

It is the object of the present invention to provide a self-propelled fumigating unit embodying means for heating and vaporizing fumigating agents such as hydrocyanic acid or mixtures thereof with water in a simple, efficient and economical manner.

Another object of the invention is the provision of means for adequately purging the apparatus after each discharge of hydrocyanic acid or other vapors so that all danger of accidental release of vapors is avoided.

Further objects and advantages of the invention will be apparent as it is better understood by reference to the following specification and accompanying drawing, in which Fig. 1 is a longitudinal section through an apparatus embodying the invention;

Fig. 2 is a plan view thereof; and

Fig. 3 is a vertical section on the line 3—3 of Fig. 1.

In carrying out the invention we utilize the waste heat developed in an internal combustion engine for the vaporization of the hydrocyanic acid or other fumigating agent. Preferably the heat of the circulating system as well as that of the waste gases is employed. As is well known, the water in the circulating system of an internal combustion engine is maintained during the normal operation of the engine at a temperature of upward to 100° C. It is quite usual for the temperature to remain at about 90° C. when the engine is properly functioning. Usually this heat is dissipated through the radiator but it furnishes a source of heat which can be applied to advantage in vaporizing the fumigating agent. The major portion of the heat employed is derived, however, from the exhaust gases from the outlet manifold of the engine. These gases escape at relatively high temperatures which vary with the richness of the combustible mixture supplied to the engine. A rich mixture with a retarded spark provides exhaust gases at the highest temperature, but it is undesirable to operate the engine in this manner owing to the resulting accumulation of carbon in the cylinders. We prefer to operate the engine in the normal manner and to supply additional heat as hereinbefore indicated from the circulating water of the engine.

To this end we introduce hydrocyanic acid or other fumigating agent in liquid form and in measured quantities to a coil or other suitable means for effecting heat exchange with the circulating water. The coil, for example, may be disposed in a supplemental tank secured to and connected with the radiator of an automobile. The liquid hydrocyanic acid in passing through the coil is warmed to the temperature of the circulating water and partially vaporized. It passes thence to another coil or equivalent heat exchanger disposed in the outlet manifold of the engine and in an extension thereof. To utilize the heat of the exhaust gases to the maximum advantage it is preferable to convey the hydrocyanic acid to a point adjacent to the outlet from the manifold extension and to permit it to return to the coil at a point near the last or rearmost exhaust port from the engine. The vapors and any remaining liquid are thence conveyed to the forward end of the manifold and permitted to return through the coil or exchanger to a point adjacent the last outlet port which has been found in the Ford engine to be approximately the hottest point in the manifold. The vapors which at this point are highly superheated are then delivered from the manifold and conveyed through a suitable flexible connection to the enclosure which surrounds the vegetation to be treated.

The liquid hydrocyanic acid is introduced to the heating system, after being suitably measured to ensure a proper dosage, by means of a pump. A check valve is provided to prevent the return of the liquid and the continued travel of the vapors is ensured by the introduction preferably of air by means of a pump through a suitable check valve. The air following the liquid and vapors through the heating coils ensures the purging of the apparatus after each discharge so that no after-generation of hydrocyanic acid vapors is possible. The safety of the operators is thus ensured.

Obviously the particular arrangement of the heating coil in the manifold could be varied depending upon the peculiar characteristics of the engine in conjunction with which the apparatus is used. It is desirable that the liquid hydrocyanic acid should enter the heat exchanger near the point of lowest temperature and should be delivered therefrom at the point of highest temperature. The coil or heat exchanger should accordingly be arranged with this purpose in view. The form of the coil or heat exchanger may vary, many forms of such devices being known. Similarly the details of purging the apparatus may be varied, for example, by employing compressed air which is stored under pressure in a suitable tank instead of utilizing a pump to supply the air. Water may also be used to purge the apparatus, the water being first forced by a pump through a coil in the manifold wherein it is converted into steam and then delivered to the coil in which hydrocyanic acid is vaporized. Obviously if steam is used to purge the apparatus it should not be introduced in the coil which provides heat-interchange with the circulating water of the engine because the latter is at a lower temperature. The exhaust gases of the engine may also be used to purge the apparatus by diverting a portion thereof from the end of the manifold into the vaporizing coil under suitable control. Other gases such as carbon dioxide, nitrogen, etc., could be stored in suitable tanks under pressure and released in the vaporizing coil to purge the latter of hydrocyanic acid, but the use of such means necessarily involves additional expense.

Referring to the drawing, 5 indicates a chassis of a suitable vehicle upon which an engine 6 is mounted. The engine is provided with the usual apparatus for supplying combustible mixtures thereto. At the front of the vehicle a radiator 7 is mounted and connected to the circulating system of the engine to permit the usual circulation of cooling water. A tank 8 is preferably disposed at the top of the radiator and communicates therewith so that the heated water entering the radiator will rise into the tank and thus transfer heat to a coil 9 disposed therein. Under certain conditions when the heat is being effectively transferred for the purpose of vaporizing hydrocyanic acid the radiator may be closed by means of a suitable shutter. It is understood that from the tank 8 the water returns through the usual connections to the cooling jacket of the engine.

Liquid hydrocyanic acid or a mixture thereof with water or any suitable fumigating agent which is to be vaporized is supplied through a pipe 10 from a source of supply such as a tank which is carried on the vehicle. A suitable measuring device, such, for example, as that illustrated and described in the application of Joseph D. Neuls, Serial No. 589,255, is provided to permit the application of a measured dosage of the hydrocyanic acid. The measuring device is preferably provided with a plunger which enables the operator to force the liquid through the pipe 10 and a check valve 11 into the coil 9 through a connecting pipe 12. After passing through the coil 9 the liquid hydrocyanic acid and vapors travel through a pipe 13 to the rear end of a manifold extension 14. The latter is connected to a manifold 15 which is somewhat larger than the usual manifold on the engine and communicates with the exhaust ports 16 thereof. The manifold extension 14 is provided with an exhaust gas outlet 17 which permits escape of the exhaust gases after the heat thereof has been utilized for the purposes of the invention.

A coil or other heat exchanger 18 is disposed in the manifold extension 14 and connected to the pipe 13. The vapors are delivered from the pipe 13 to the coil 18 and travel backwardly therethrough to a point near the juncture of the manifold extension 14 and manifold 15. Thence they are conveyed by a pipe 19 to the forward end of a coil 20 or other heat exchanger disposed within the manifold. The vapors return through the coil 20 to a point adjacent the juncture of the manifold extension 14 and manifold 15 and are delivered through a pipe 21 which passes through the end of the manifold extension. To this pipe 21 a flexible hose may be secured to facilitate the delivery of the vapor to the enclosure which surrounds the vegetation.

To purge the apparatus a pump 22 of any suitable form and construction is supported on the chassis 5 adjacent the engine and is provided with a driving connection from the latter. A clutch 23 permits this pump to be thrown into and out of operation at the will of the operator. After the charge of hydrocyanic acid has been introduced through the valve 11 the pump is started by the operator to force a blast of air through a pipe 24 and valve 25 into the pipe 12, thence following the course of the vapors described above. This blast of air, as hereinbefore noted, forces the vapors through the several coils or heat interchangers and purges the apparatus of poisonous fumes after each charge has been delivered.

As the heat utilized in the apparatus is solely the waste heat of the engine, vaporization is accomplished without expense other than that necessary in operating the engine. The latter is necessary for the purpose of conveying the apparatus to and from, as well as about the orchard to be fumigated, and as the successive charges are delivered with great rapidity the apparatus is extremely economical. In fact the facility with which the apparatus may be transported and utilized very materially reduces the expense of fumigating orchards and the like. The apparatus permits the application of a high degree of superheat to the vapors as is desirable to avoid condensation of the hydrocyanic acid before it has accomplished its intended purpose. The hydrocyanic acid is made more effective and it is possible, moreover, to utilize the apparatus when the temperature of the atmosphere is lower than that under which it has been possible heretofore to conduct fumigation. The apparatus is particularly effective in connection with the use of mixtures of hydrocyanic acid and water in which the proportion of water is such as to convey the desired amount of heat to the enclosure so that the temperature therein is raised to a point which makes the hydrocyanic acid most effective in destroying insect pests.

Various changes may be made in the form and arrangement of the parts without departing from the invention or sacrificing any of the advantages thereof.

We claim :—

1. In a fumigating apparatus the combination of a vehicle with an internal combustion engine to supply driving power therefor having an exhaust gas manifold and an extension thereof, heat exchangers in the manifold and extension, and means for delivering the medium to be vaporized successively to the heat exchangers in the extension and manifold whereby the maximum heating effect of the exhaust gases is utilized.

2. In a fumigating apparatus the combination of a vehicle with an internal combustion engine to supply driving power therefor having an exhaust gas manifold, an extension thereof and a circulating cooling system, heat exchangers in the manifold, the extension and the circulating cooling system and means for delivering the medium to be vaporized successively to the heat exchangers in the circulating cooling system, the extension and the manifold, whereby the maximum heating effect of the waste heat of the engine is utilized.

3. In a fumigating apparatus the combination of a vehicle with an internal combustion engine to supply driving power therefor having a circulating cooling system adapted to contain a circulating medium and means for utilizing the waste heat of the engine to vaporize the fumigating medium including a heat exchanger in the circulating cooling system conveying the fumigating medium separately from the circulating medium.

4. In a fumigating apparatus the combination of a vehicle with an internal combustion engine to supply driving power therefor having a circulating cooling system adapted to contain a circulating medium, means for utilizing the waste heat of the engine to vaporize the fumigating medium including a heat exchanger in the circulating cooling system, conveying the fumigating medium separately from the circulating medium and a heat exchanger adapted to transfer heat to the medium from the exhaust gases of the engine.

5. In a fumigating apparatus the combination of a vehicle with an internal combustion engine to supply driving power therefor having a circulating cooling system, means for utilizing the waste heat of the engine to vaporize the fumigating medium including a heat exchanger in the circulating cooling system, and a heat exchanger adapted to transfer heat to the medium from the exhaust gases of the engine, the latter heat exchanger being arranged to transfer heat first from the exhaust gases at lower temperature and then from the exhaust gases at higher temperature.

6. In a fumigating apparatus the combination of a vehicle with an internal combustion engine to supply driving power therefor having a circulating cooling system, means for utilizing the waste heat of the engine to vaporize the fumigating medium including a heat exchanger in the circulating cooling system and means for purging the apparatus.

7. In a fumigating apparatus the combination of a vehicle with an internal combustion engine to supply driving power therefor having a circulating cooling system, means for utilizing the waste heat of the engine to vaporize the fumigating medium including a heat exchanger in the circulating cooling system and means for purging the apparatus including a pump and a connection to the heat exchanger.

8. In a fumigating apparatus the combination of a vehicle with an internal combustion engine to supply driving power therefor having a circulating cooling system, means for utilizing the waste heat of the engine to vaporize the fumigating medium including a heat exchanger in the circulating cooling system, and a heat exchanger adapted to transfer heat to the medium from the exhaust gases of the engine, and means for purging the vaporizing means.

9. In a fumigating apparatus the combination of a vehicle with an internal combustion engine to supply driving power therefor having a circulating cooling system, means for utilizing the waste heat of the engine to vaporize the fumigating medium including a heat exchanger in the circulating cooling system, and a heat exchanger adapted to transfer heat to the medium from the exhaust gases of the engine, and means for purging the vaporizing means including a pump and a connection to the heat exchanger.

10. In a fumigating apparatus the combination of a vehicle with an internal combustion engine to supply driving power therefor having a circulating cooling system, an auxiliary tank communicating with the circulating cooling system, a heat exchanger in the auxiliary tank and means for delivering the medium to be vaporized to the heat exchanger.

11. In a fumigating apparatus the combination of a vehicle with an internal combustion engine to supply driving power therefor having a circulating cooling system, an auxiliary tank communicating with the circulating cooling system, a heat exchanger in the auxiliary tank, means for delivering the medium to be vaporized to the heat exchanger, a heat exchanger adapted to transfer heat to the medium from the exhaust gases of the engine and a connection between the heat exchangers.

12. In a fumigating apparatus the combination of a vehicle with an internal combustion engine to supply driving power therefor having a circulating cooling system, an auxiliary tank communicating with the circulating cooling system, a heat exchanger in the auxiliary tank, means for delivering the medium to be vaporized to the heat exchanger, a heat exchanger adapted to transfer heat to the medium from the exhaust gases of the engine, a connection between the heat exchangers and means for purging the exchangers.

13. In a fumigating apparatus the combination of a vehicle with an internal combustion engine to supply driving power therefor having a circulating cooling system, means for utilizing the waste heat of the engine to vaporize the fumigating medium including a heat exchanger in the circulating cooling system, a heat exchanger adapted to transfer heat to the medium from the exhaust gases of the engine and an air pump connected to the heat exchangers to force the vaporized fumigating medium therefrom.

14. In a fumigating apparatus the combination of a vehicle with an internal combustion engine to supply driving power therefor having a circulating cooling system, means for utilizing the waste heat of the engine to vaporize the fumigating medium including a heat exchanger in the circulating cooling system, a heat exchanger adapted to transfer heat to the medium from the exhaust gases of the engine, an air pump connected to the heat exchangers to force the vaporized fumigating medium therefrom and means to prevent return of the fumigating medium to the air pump.

In testimony whereof we affix our signatures.

FLOYD J. METZGER.
JOSEPH D. NEULS.